(12) United States Patent
Kenward et al.

(10) Patent No.: US 8,351,396 B2
(45) Date of Patent: *Jan. 8, 2013

(54) CONTEXT TRANSFER SYSTEMS AND METHODS IN SUPPORT OF MOBILITY

(75) Inventors: Gary W. Kenward, Manotick (CA); Hamid Mahmood Syed, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,516

(22) Filed: Oct. 6, 2011

(65) Prior Publication Data

US 2012/0076110 A1   Mar. 29, 2012

Related U.S. Application Data

(63) Continuation of application No. 12/938,700, filed on Nov. 3, 2010, now Pat. No. 8,059,587, which is a continuation of application No. 11/401,888, filed on Apr. 12, 2006, now Pat. No. 7,848,753, which is a continuation of application No. 10/115,086, filed on Apr. 4, 2002, now Pat. No. 7,050,793.

(60) Provisional application No. 60/281,019, filed on Apr. 4, 2001.

(51) Int. Cl.
*H04W 4/00* (2009.01)

(52) U.S. Cl. ........................... 370/331; 370/328

(58) Field of Classification Search ............. 455/437, 455/440, 405, 436, 442, 439; 370/465, 247, 370/331, 389, 332; 709/219, 224, 225

See application file for complete search history.

(56) References Cited

U.S. PATENT DOCUMENTS

| | | | |
|---|---|---|---|
| 5,784,562 | A | 7/1998 | Diener |
| 5,907,805 | A | 5/1999 | Chotai |
| 6,137,783 | A | 10/2000 | Sallberg |
| 6,300,887 | B1 | 10/2001 | Le |
| 6,577,868 | B1 | 6/2003 | Vialen et al. |
| 6,590,961 | B1 | 7/2003 | Gulli et al. |
| 6,603,972 | B1 | 8/2003 | Sawyer |
| 6,611,547 | B1 | 8/2003 | Rauhala |
| 6,636,491 | B1 | 10/2003 | Kari et al. |

(Continued)

OTHER PUBLICATIONS

Syed, Hamid et al., "General Requirements for Context Transfer", Internet Engineering Task Force Internet Draft, Jan. 2002.

(Continued)

*Primary Examiner* — Kiet Doan

(74) *Attorney, Agent, or Firm* — Meyertons, Hood, Kivlin, Kowert & Goetzel, P.C.

(57) ABSTRACT

A broad aspect of the invention provides a method of providing mobility support for a mobile node's traffic. The method involves maintaining context information for the mobile node on each of a first plurality of network nodes carrying the traffic; and proactively transferring and maintaining at least a portion of the context information in a plurality of network nodes which are not carrying the traffic, but which are candidates for carrying the traffic due to mobility of the mobile node. The method typically further involves defining and maintaining a definition of the second plurality of network nodes. In one embodiment of the invention, this involves adding a particular network node to the second plurality when the particular network node becomes a candidate for carrying the traffic, removing a particular network node from the second plurality when the particular network node is no longer a candidate for carrying the traffic.

22 Claims, 13 Drawing Sheets

U.S. PATENT DOCUMENTS

| | | |
|---|---|---|
| 6,661,782 B1 | 12/2003 | Mustajarvi et al. |
| 6,731,932 B1 | 5/2004 | Rune et al. |
| 6,751,748 B1 | 6/2004 | Bush |
| 6,847,610 B1 | 1/2005 | Suumaki et al. |
| 6,876,747 B1 | 4/2005 | Faccin et al. |
| 7,006,472 B1 | 2/2006 | Immonen et al. |
| 7,042,876 B1 | 5/2006 | Jayasenan et al. |
| 7,050,793 B1 | 5/2006 | Kenward et al. |
| 2002/0077086 A1 | 6/2002 | Tuomela et al. |
| 2002/0167965 A1* | 11/2002 | Beasley et al. ............... 370/465 |

OTHER PUBLICATIONS

Kempf, J., "Context and Micro-Mobility Routing Working Group", Internet Draft, Nov. 2001, pp. 1-12.

Mobile IP Working Group, Semoby Charter, Nov. 2000.

Karim El Malki et al., "Low Latency Handoffs in Mobile IPv4", Mobile IP Working Group, Internet Draft, Feb. 2001, http://ietfreport.isoc.org/add-ids/draft-ietf-mobileip-lowlatency-handoffs-v4-00.txt.

* cited by examiner

CONTEXT TRANSFER SYSTEMS AND METHODS IN SUPPORT OF MOBILITY

This application is a continuation of U.S. patent application Ser. No. 12/938,700 filed on Nov. 3, 2010, which is a continuation of U.S. Pat. No. 7,848,753 issued on Dec. 7, 2010, which is a continuation of U.S. Pat. No. 7,050,793 that issued on May 23, 2006, which claims the benefit of U.S. Provisional Application 60/281,019, filed Apr. 4, 2001.

FIELD OF THE INVENTION

The invention relates to methods and systems for mobility of mobile nodes, and more particularly to supporting the maintenance of data flows when mobile nodes move between coverage areas.

BACKGROUND OF THE INVENTION

In networks where hosts are mobile, the success of real-time sensitive services like VoIP telephony, video, and others rests heavily on the matter of how seamless a handover can be made. The IETF Mobile IP solution supports best effort handovers with potential service disruption, and the variations of Mobile IP (Hierarchical MIP and Fast Handover) attempt to reduce the packet loss and latency but do not address real-time service disruption.

In an IP context, perfect seamlessness means that mobility would not impact the user of IP based services with any reduction in the quality of the service received. The service quality offered at any new access node is a balance between the capabilities of the node and the service quality requirements of the user's active sessions. Enabling solutions for seamless mobility are required.

SUMMARY OF THE INVENTION

A broad aspect of the invention provides a method of providing mobility support for a mobile node's traffic. The method involves collecting context information for the mobile node on each of a first set of at least one network node carrying the traffic; and proactively transferring at least a portion of the context information to a second set of at least one network node(s) which are not carrying the traffic, but which are candidates for carrying the traffic due to mobility of the mobile node.

In one embodiment of the invention, a particular access node is added to the second set when the particular access node becomes a candidate for carrying the traffic, and a particular access node is removed from the second set when the particular access node is no longer a candidate for carrying the traffic. Furthermore, for each node in the second set of access nodes, a definition is made of a node in the first set of access nodes from which to obtain the context information.

The method can be applied to various data traffic protocols and in some embodiments can be applied to voice packet protocols. In a preferred embodiment, the method is applied to IP traffic.

In one embodiment of the invention, the context information is defined to include two types of context information. A first type of context information is any context information which changes relatively seldom. A second type of context information is any context information which changes relatively frequently. In a preferred embodiment, the portion of the context information maintained in the second set of access nodes is the first type of context information. Then, upon determination of one or more access nodes in the second set of nodes to which the traffic is to be actually transferred, the second type of context is transferred to the one or more access nodes in the second set of nodes.

The first type of context information might for example include authentication and authorization information. The second type of context information might for example be metering, accounting, buffer state information, security state, header compression state, quality of service state, and multicast group membership state.

A particular access node is added to the second set of access nodes upon the particular access node detecting a presence of a mobile node within its coverage area. Access nodes required to set up a path from such an access node are also added to the second set.

In some embodiments of the invention, the context transfer is performed using a distributed transfer approach in which the access nodes perform the actual transfer of context.

In some embodiments, the group membership is maintained by each access node receiving an event when a mobile node is found in its coverage area or leaves from its coverage area. Upon an access node receiving an event indicating a mobile node is in its coverage area, the access node finds a context transfer source within the first set for initiating a transfer of context, and the access node becomes one of the second set of access nodes.

A membership information exchange mechanism may be provided by which access nodes in the second set can determine which access nodes belong to the first set. In some embodiments a synchronization mechanism is provided to keep the context updated within the access nodes of the second set.

In another embodiment of the invention a complete context information can be maintained in the second set of access nodes. This may for example involve first transferring the entire context to an access node when it becomes one of the second set, and then from time to time sending updates reflecting any changes to the entire context.

In some embodiments, in the event the mobile node's traffic has a plurality of active sessions, a mechanism may be provided to handover the mobile node's active sessions to multiple different nodes of the second set in a situation where no single member of the second plurality can support all of the active sessions as defined by the context information.

In some embodiments, after a handoff, access nodes which are candidates for handoff are advised of new nodes from which to obtain the context information.

In some embodiments, in the event of a handoff to a set of access nodes including at least one access node not in the second set, context is reactively transferred to the at least one access node not in the second set.

In some embodiments, the method further involves transferring context reactively to one or more access nodes in the second set.

In some embodiments, each node in the second set reserves resources required to accept the mobile node's traffic.

In some embodiments, a handover control function sends an instruction to access nodes in the second set to which the mobile node's traffic is to be transferred instructing the access nodes to reserve resources required to accept the mobile node's traffic.

Another broad aspect of the invention provides a context transfer agent which has functionality residing on an access node responsible for collecting context information in respect of a mobile node's traffic. The context transfer agents at each access node participate in the actual transfer of context between access nodes.

In some embodiments, the method further involves access nodes using the context information together with information on the node's capabilities to determine whether the access node can afford to support the mobile node's traffic. This determination produces an admission control result that is sent to a functional entity responsible for making the decision to handover the mobile node's traffic to a new access node. For example in some embodiments, the context transfer agent is adapted to interact with an admission control function to see if a given node can support traffic as specified by the context. Such information is then forwarded to a handover decision function.

Another broad aspect of the invention provides a membership collection and distribution function (MCDF) adapted to keep track of the first set of nodes for each mobile node and to make this membership information available to any new node that wants to obtain context for the mobile node and become one of the second set for the mobile node.

BRIEF DESCRIPTION OF THE DRAWINGS

The preferred embodiments of the invention will now be described with further reference to the attached drawings in which.

DETAILED DESCRIPTION OF THE PREFERRED EMBODIMENTS

Figure 1:
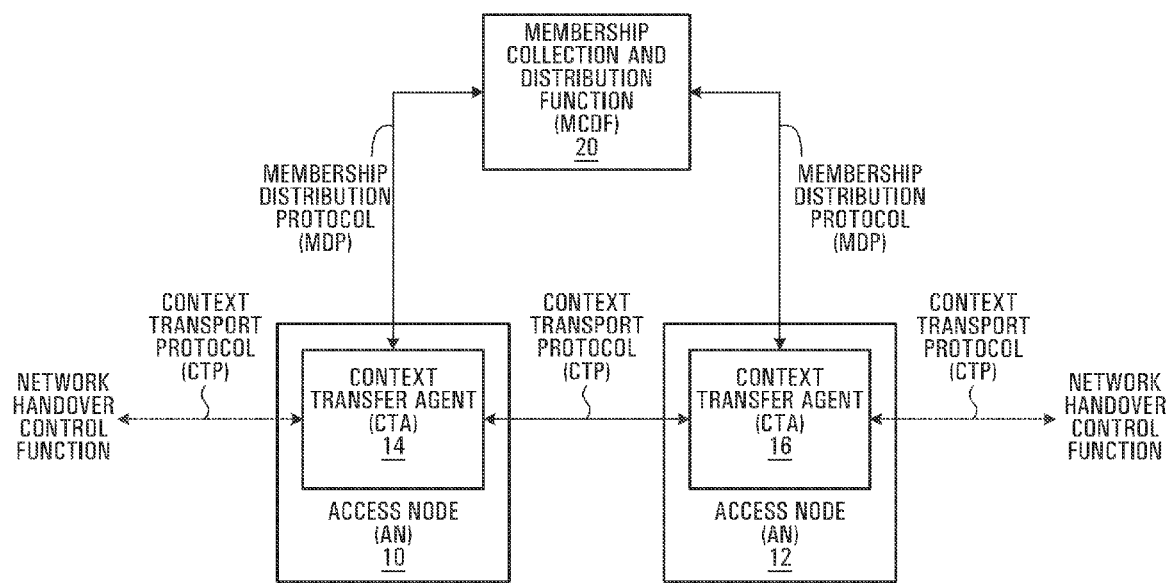
FIG. 1 is a block diagram of a context transfer framework provided by an embodiment of the invention.

Embodiments of the invention provide context transfer mechanisms that help to enable seamless handover of a mobile node's active sessions by transferring the "context" information needed to support the microflows associated with each active session. Context transfers reduce the effect of handovers on real-time applications by minimizing the time needed to re-establish a level of service equivalent to that provided to the mobile node's traffic by previous nodes.

A fundamental unit of IP service is the microflow. IP microflows may be bundled, or aggregated, for a variety of reasons. As examples, the IETF Differentiated Services are typically provided to aggregates of IP microflows, and authentication is typically associated with all the IP microflows having the same source address. In general, however, the smallest component of traffic sent to and from a given mobile node that may be considered to have distinct context is an IP microflow.

IETF RFC 2475[4] (see www.ietf.org) defines a microflow as "A single instance of an application-to-application flow of packets destined to or originated from a mobile device (MN or MH), which is identified by source address, source port, destination address, destination port and protocol id."

IETF RFC 2207[5] (see www.ietf.org) also provides a definition of a microflow based on the IETF IPSEC SPI found in the AH or ESP header. Other IETF definitions for microflows may be forthcoming in the future, and, in particular, the use of the IPv6 flow label may be standardized.

The context includes pieces of information that are not expected to change for the life of an active session such as traffic classification rules, classes of service, authentication and authorization etc. Such information is referred to herein as a first type context component.

The context also includes information that is expected to vary dynamically, for example, the state variables for a header compression algorithm, metering, accounting, buffer state information, accounting state, security state, quality of service state, and multicast group membership state, which may change with each packet processed. Such information is referred to herein as a second type context component.

This context may also include information required to support the mobile node's data traffic at more than one communications layer, e.g. configuration and state for an active PPP (IETF Point to Point Protocol) session. This includes both first and second type context.

Due to the rapidly changing nature of the second type context component, the task of synchronizing this component between nodes on a continuing basis can be challenging. However, if the most recent short term context information is not available at the new node when a handover from the old node occurs, the seamlessness of the handover cannot be assured.

To assist in the further description, various definitions will now be provided.

An Access node (AN) is a device within an access network that performs switching and/or routing of traffic.

An Access point (AP) is a device providing physical and link layer services to mobile nodes. For example, AP's provide the air interface to the mobile node. It is noted that APs may be separate physical devices from ANs, or alternatively may be part of ANs. In the general case, an MN may have potential connectivity through more than one access point (AP) at any time. The determination of which APs are able to communicate with the MN is dependent entirely on the link characteristics and the lower layer protocols and services.

Coverage Area (CA)—The coverage area for an access node (AN) can be defined in terms of the access points (APs) connected to that AN as part of the network topology or configuration. An AN at the edge of the access network (an edge AN) is connected to one or more APs, and the collection of RF coverage areas serviced by each AP forms the total coverage area for the AN.

A Mobile Node (MN) is a device capable of relocating from one coverage area to another. This usually includes mobile user devices, but may also include mobile network devices, for example a mobile router.

Mobile Arrival Event (MAE)—The MAE is a notification delivered to an AN when a MN enters the AN's coverage area. Reception of an MAE indicates that an AP connected to the AN has, in some fashion, determined the presence of a MN, for example by detecting its signal transmissions at some level. This detection could be based upon detection of a received signal at the AP, the ability of the AP to establish physical communications with the MN, or any other condition that indicates that the MN is partially or completely within the ANs coverage area. As the MN is physically moving, an indication of partial presence within the ANs coverage area may be used as a warning that the MN may soon be completely within the coverage area. In either case, an AN receiving an MAE may interpret it as a warning that a potential handover of the MN's traffic is imminent.

Mobile Departure Event (MDE)—The MDE is a notification delivered to an AN when an AP detects, through some method, that a MN has left the APs coverage area. Reception of a MDE indicates that connectivity between the AP—and thus the associated AR—and the MN has been lost. In some scenarios, however, it is possible, that connectivity between an AP and an MN is lost before an MDE to the AN can be generated.

HandOver Event (HOE)—The HOE is a notification delivered to two or more ANs indicating that a handover of a MN's traffic must take place. The HOE is delivered, at the very least, to an AN that is currently supporting the MN's traffic, and at least one AN that is targetted to support the MN's traffic after the handover is complete.

Proactive Context Transfer—With proactive context transfer, the context information required to completely support a MN's traffic is available at an AN prior to the time at which the first packets must be forwarded.

If an MN's traffic is to be supported by more than one AN after handover, then a context transfer is considered proactive if the necessary context is made available at each AN prior to the time at which the first data packets must be forwarded at that AN. Proactive context transfer is the preferred mode of operation.

Reactive Context Transfer—This is the mode of operation that occurs when the context transfer fails to occur proactively. This implies that an AN will be required to forward packets from the MN's traffic, without having the necessary context in place. The effect of a reactive context transfer should, in general, be limited to a temporary degradation in the forwarding treatment provided at the new AN to the MNs traffic.

General Characteristics of Context Transfer Framework

In this section, the general characteristics for the transfer of context to help seamless handover of a mobile node's (MN's) traffic are provided.

An AP is typically connected to only one AN, but, one AN may be connected to a multiplicity of APs. Given a group of APs that have potential connectivity with an MN, they all may be connected to a single AN, or some APs may be connected to different ANs, or each AP may be connected to a different AN. For a given MN, there may also be one or more access nodes which are carrying the MN's traffic through the network. The ANs selected to support the MNs traffic are determined by the routing and handover functions of the access network. The ANs supporting the MNs traffic constitute sources of context and will be referred to as context source ANs.

Another set of ANs include those that are connected directly to APs that have detected the presence of the MN, and are not currently supporting any of an MNs traffic. The set may also include for each particular network node directly connected to an AP which has detected the presence of the MN, one or more access nodes which would be used to set up a path through the network from the particular AN. The identification of the nodes in these paths is beyond the scope of this invention. This set of ANs are candidates for handover of the MNs traffic.

The ability of a given AP to provide connectivity to the MN can change as the MN moves. The access network's handover function re-directs the MNs traffic to those APs capable of supporting connectivity. Changing an AP may require a change in one or more ANs. The AN(s) selected by the access networks handover function are referred to as the target ANs. The ANs capable of supporting the MNs traffic constitute candidates as handover targets and will be referred to as candidate ANs.

The forwarding treatments provided by an AN to the MN's traffic is determined during configuration of various AN services at session set-up time. Often these services are supported over time through the use of state information. The combination of configuration parameters and state information is referred to as the context for the MN's traffic at a supporting AN. Configuration parameters and state information are sometimes referred to, respectively, as static and dynamic context. However, for the purpose of this description, the context will be divided into first type context and second type context as defined previously.

Handover of the MN's traffic to a target AN will cause a disruption in the service provided, unless the target AN is provided with the most current context for the MN's traffic. By transferring a replication of the context from an AN that was supporting the MNs traffic, to the AN that will be supporting the MNs traffic, the handover will take place without any disruption in the service quality. The handover between ANs will be seamless.

Transferring context between ANs requires an exchange of information that takes time, and if the transfer is deferred until the handover takes place a disruption of service is likely to occur. By identifying the ANs that are candidates for handover before the actual handover occurs, context transfers can be initiated, and ideally, completed before the actual traffic re-direction occurs. This early transfer of context to candidate ANs has been defined above as proactive context transfer.

Proactive context transfer is the preferred mode of operation. However, the physical properties of communications to a mobile node moving with arbitrary velocity, make it impossible to guarantee that all candidate ANs can be identified, and also make it impossible to guarantee that the context transfer will be complete prior to a handover decision. In scenarios where the context transfer is not initiated or does not complete before the MN's traffic begins to arrive at the target AN, the establishment of the necessary supporting context is reactive rather then proactive.

In one embodiment of the invention, a distributed context transfer approach is provided in which the access nodes orchestrate the transfer of context between each other. Since the most updated context information exists at the access nodes currently supporting traffic (context source ANs), and since the access nodes along the paths to the APs that see the MN within their coverage areas (candidate ANs) are the most cognizant (as a consequence of their association to the APs) of their candidacy for handoff, the distributed approach is the most effective, with fewer communication delays intruding upon the timely completion of the context transfer. This distributed approach is the preferred embodiment and will be described in detail. However, in another embodiment of the invention a centralized method of context transfer may also be employed albeit with a higher level of complexity and likely higher context transfer latencies.

A Context Group (CG) is defined herein as a logical grouping of those ANs that are currently supporting the MNs traffic (the context source ANs) and those ANs that are candidates for the imminent handover of the MN's traffic (the candidate ANs). Each MN has an associated CG, and each AN in that CG must possess either the context supporting the MNs traffic, or a current replication of that context. As a corollary, a CG is comprised of all ANs that possess the context for the MNs traffic. The fact that an AN is a candidate AN member of an MN's CG does not imply that the AN will be the target of a handover of the MN's traffic, only that it may be a target. Moreover, the members of a CG are not topologically constrained in any way: they may or may not be located in the same subnetwork, and they even may or may not be located in the same administrative domain.

Context Group Management Methods

The Context Group Management Methods refer collectively to methods used to maintain membership in context groups for mobile nodes. The membership of an AN in the MN's CG is determined by conditions that are dynamic and unpredictable, being dependent primarily upon the physical properties of each communications link between AP and MN, and the functional logic of the supporting link layer and movement of the MN. Therefore, the formation of a CG for the MN, and addition and removal of ANs is a dynamic process which requires methods for establishment and management.

A context source AN is added to the MNs CG when the AN first begins to support the MN's traffic. Likewise, an AN is removed as a context source member of the CG when it no longer supports the MNs traffic. The latter might result from a handover of the MN's traffic, or from a discontinuation of all the MNs communication sessions that were being supported.

A candidate AN is added to the MN's CG as a result of the AN receiving an MAE. The candidate ANs included in setting up a path from such a newly added candidate AN are also added to the MN's CG. These may be identified using any suitable method. One example is described in copending application 60/369,560 entitled "PARC management mechanisms to support seamless mobility" filed Mar. 31, 2003 and commonly assigned, hereby incorporated by reference in its entirety. Similarly, an MDE invokes the removal of a candidate AN from the MN's CG. However, other events may also be used to invoke the removal of candidate ANs from the MN's CG. If all context source ANs are removed from the CG, then, logically, all candidate ANS should also be removed. In addition, for some link layer technologies and access network designs, a lifetime is assigned to an ANs candidate membership, and a candidate AN is removed from the MN's CG when its life time expires.

The context group management methods also support the distribution of CG membership information to each member of the CG. This information can be used for a number of purposes, but one of the primary uses is to provide a candidate AN with a list of context source ANs for the MN's traffic. The candidate AN uses this list to initiate a context transfer directly with a context source AN as detailed below. This may be implemented using the membership collection and distribution protocol described below.

Context Transfer Framework Functional Elements

The main functional elements of the context transfer framework are the context transfer agent (CTA) and the membership collection and distribution function (MCDF). FIG. 1 shows a simple configuration involving these two elements. Shown are two access nodes 10, 12 each having a respective context transfer agent 14, 16. Also shown is a single MCDF 20. The context transfer agents 14, 16 communicate with each other and other context transfer agents (not shown) using a first protocol referred to as the Context Transfer Protocol (CTP). The context transfer agents 14, 16 communicate with the MCDF 20 using a second protocol referred to as the Membership Distribution Protocol. In embodiments requiring the interaction with a handover control function, this may be implemented as part of the CTP.

Each CTA is a component residing at an AN. It is responsible for the collection of all service feature contexts and the creation of replicants of the MN's context for transfer to candidate ANs. The functions for extraction of context from service elements in an AN for delivery to the CTA are AN implementation specific.

The CTA effects the transfer of the MN's context to candidate ANs using the context transfer protocol (CTP). The CTA also forwards the feedback on the admission decision from any context group member to a network handover control function.

CTP is a new protocol which provides the methods to transfer the MN's context from a context source AN to the candidate ANs. The CTP conveys at least the identity of the MN, the identity of the source AN, and the MN context information. The transferred MN context is organized in a standardized format such that the candidate ANs can identify each component of the context (e.g. each service feature context for each microflow) and then interpret each component accordingly. There are at least two different context transfer approaches contemplated by the invention. In the first approach, first type context is transferred proactively to all candidate ANs, and second type context is only transferred to target ANs once identified as such. This will be referred to as "two-stage context transfer". In some embodiments featuring two-stage context transfer it is advantageous to update the first type context as changes occur. This is expected to happen infrequently. In the second approach, all of the context is transferred proactively to all candidate ANs and updates of the context are sent from time to time. CTP is implemented accordingly to achieve either of these approaches. This will be referred to as "complete with update context transfer".

The context transfer process is initiated by a candidate AN after the list of context source ANs for the MN's traffic has been acquired using the context group management methods. The result of this process is a timely replication of the MN's context information from a selected context source AN at the candiate AN. The context transfer protocol provides reliable transfer of the context information: a candidate AN must be able to rely upon the integrity of the received information before it can initiate functions whose successful operation often depends upon the provided context. If a context transfer does fail for some reason, the candidate AN is notified that the context is not reliable.

The context transfer protocol is also efficient: given the vagaries in the timing of handovers, to maximize the likelihood that the transfer of context completes before a handover occurs, and is thus proactive, the duration of the context transfer process must be minimal. This means that the number of exchanges between source and candiate AN required by the protocol to reliably transfer the MN's must also be minimal. Context transfer itself is dynamic. Since the MN initiates and discontinues communications sessions, and moves independently of any network operation, the MN's context at the context source AN can change during or immediately after a context transfer operation.

The protocol provides a method for synchronizing the replicated context at the candidate ANs with the primary context at the source AN Context. Updates may include, for example, changes in context due to microflows being added to or deleted from the MN's traffic. It also includes stateful information required to maintain some types of forwarding services. These latter changes can occur as fast as the rate of packet arrivals for the supported microflow. Since it would be inefficient to initiate context updates with every packet arrival, the context transfer protocol also provides a mechanism for deferring updates until there is an imminent need—that is, at or near the instant of the actual handover.

In some embodiments, the context has to be interpreted by each candidate AN to allow admission decisions to be made, and ultimately to allow a candidate AN to establishing support for the MN's microflows. One advantage of performing context transfer proactively is that it allows mitigating actions to be planned if a candidate AN is unable to support the MN's traffic. An AN may not have all the capabilities to support every service feature required by the MN's microflows, or it may have reached it's maximum load capacity. In either case, simply transferring context to an AN provides no assurance a handover will be successful, and a handover to an AN unable to support the MN's traffic, would likely mean that the communications sessions would be terminated.

The process of a node determining whether it can or cannot support additional traffic is usually referred to as admission control, and the result of that process is often called an admission decision. An admission control capability is specific to the design of the AN, and not part of context transfer. However, in some embodiments the context transfer protocol does provide the mechanism to relate to the network handover control function the result of a candidate ANs admission decision. This allows the handover control function to formulate a decision to handover to an AN that has decided to admit the MN's traffic.

In some embodiments, the capability of the context transfer protocol to relay admission control decisions includes methods for relaying partial admission decisions. A partial admission decision occurs when a candidate AN can support some of the AN's microflows, but not others. Regardless of the reason for this partial admission decision, the information can be used by the network handover control function to handover selected microflows from an MN's traffic to those candidate ANs that can support them. The methods for making this partial handover decision and orchestrating a partial handover are beyond the scope of this invention.

Preferably, in situations where no decision will provide seamless handover of all of the MN's traffic, the context transfer protocol provides methods that allow the network handover control function to request reductions of service to levels supportable by candidate ANs.

The membership collection and distribution function 20 is a repository for CG membership information, and provides the functional support for the essential context group management methods described above. The CTA accesses CG membership information at the MCDF using the membership distribution protocol (MDP). The MDP also incorporates functional support for the CG management methods required to create and maintain CGs.

MDP is a new protocol which provides the methods for conveying from an AN to the MCDF at least the MN's identity, the identity of the AN and whether it is a context source or candidate AN, and, in a second mode of use, at least the MN's identity and the identity of the context source AN.

The context transfer framework supports either a centralized or distributed design for the MCDF, allowing the implementor to make the trade-offs between the two approaches.

Example Context Transfer Scenarios

Figure 2A:
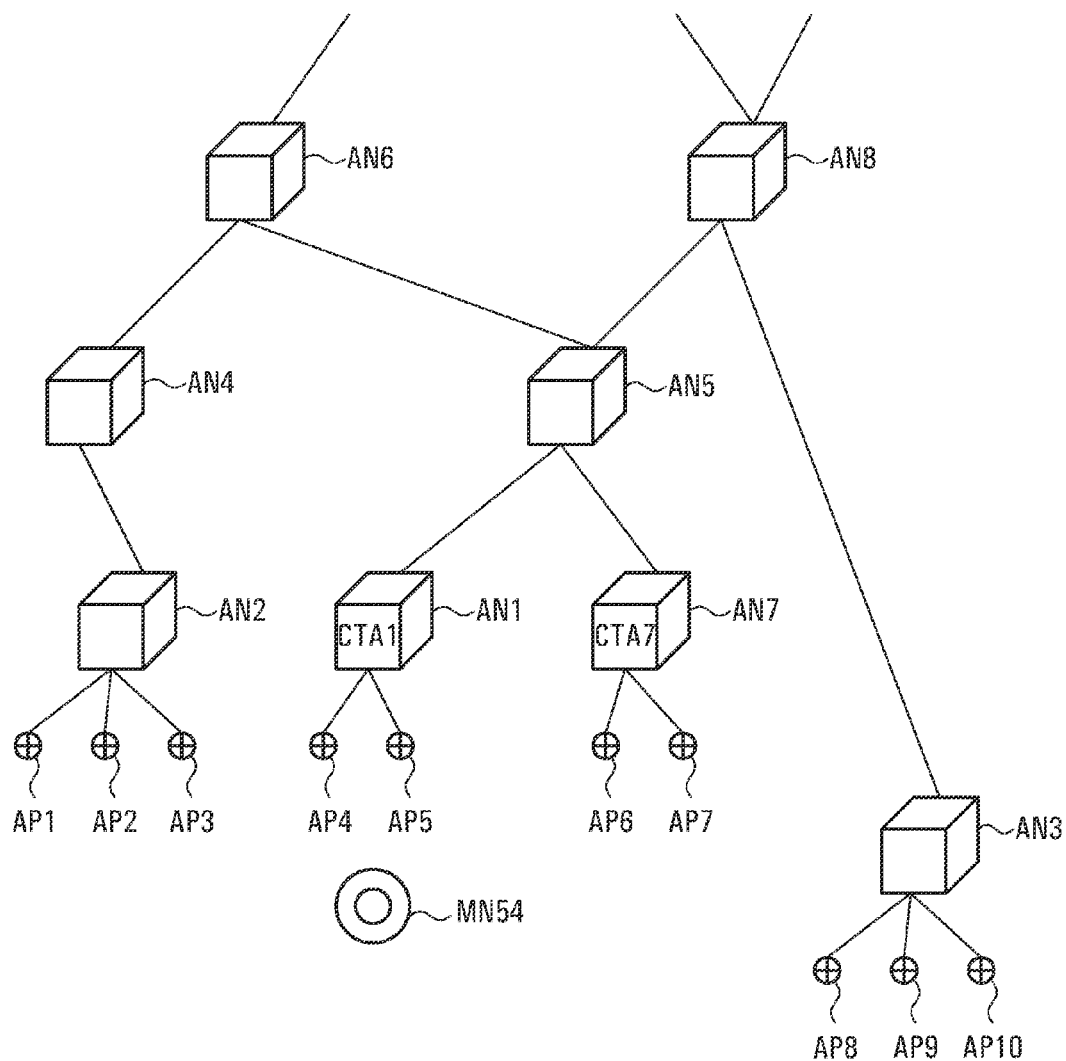
FIGS. 2A through 2E show a schematic block diagram of a network during a context transfer scenario.
Figure 2B:
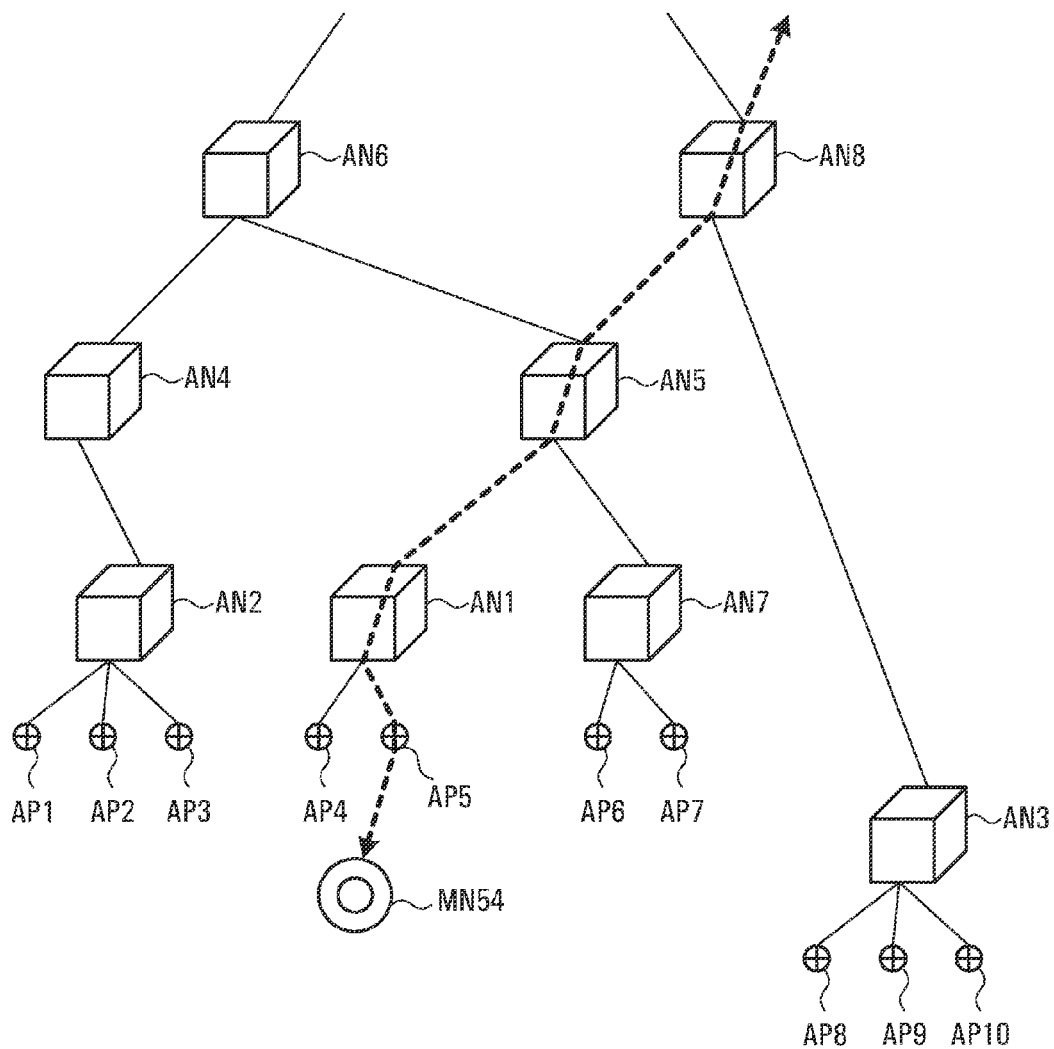

The following discussion presents some example scenarios for context transfer based upon the framework presented. The starting point for these scenarios is the example network of FIG. 2A. Referring to FIG. 2A, MN54 represents a specific mobile node in a population of mobile nodes being supported by the access network. MN54 is the subject mobile node of the scenario. AN1 and AN7 are two of the access nodes in the access networks. Also shown are other access nodes in the network including AN2, AN3, AN4, AN5, and AN8. Also shown is a set of access points. AN2 is connected to AP1, AP2 and AP3. AN1 is connected to AP4 and AP5. AN7 is connected to AP6 and AP7. AN3 is connected to AP8, AP9 and AP10. In FIG. 2A, MN54 has not established any communications sessions with the access network. Thus, initially, there is no traffic between the access network and MN54. The access network supports the above described context transfer framework. AN1 and AN7 each have context transfer agents designated CTA1 and CTA7, respectively. The other access nodes also have context transfer agents but they are not shown. For this scenario, the CTAs support the above discussed two-stage context transfer wherein the first type context is transferred intially to all candidate ANs and the second type sent only to the ANs to be involved in a handoff. A context group for MN54, referred to as MN54, has not yet been created. When it is created, it is referred to as CG54. It is assumed that MN54 arrives in the coverage area of AN1 and that AN7 supports a coverage area that is nearby the coverage area of AN1, such that mobile nodes such as MN54 can move between the two coverage areas with the expectation that the handover will be seamless.

Various scenarios will now be described with reference to sequence diagrams of FIGS. 3 through 9. A first scenario will be described with reference to the sequence diagram of FIG. 3 which relates to context group creation. This scenario begins at step 3-1 when AN1 is notified of the arrival of MN54 in its coverage area through the delivery of a MAE from one or more of its APs, AP4 or AP5. In step 3-2, CTA1 (at AN1) queries the access network's MCDF on the existence of a context group for MN54, using MDP. In step 3-3 the MCDF determines that a context group for MN54 does not exist, and creates CG54 with AN1 as its first, context source, member. In step 3-4, the MCDF informs CTA1 of the context group identity, CG54 and that AN1 is the context source, using MDP.

Figure 4:
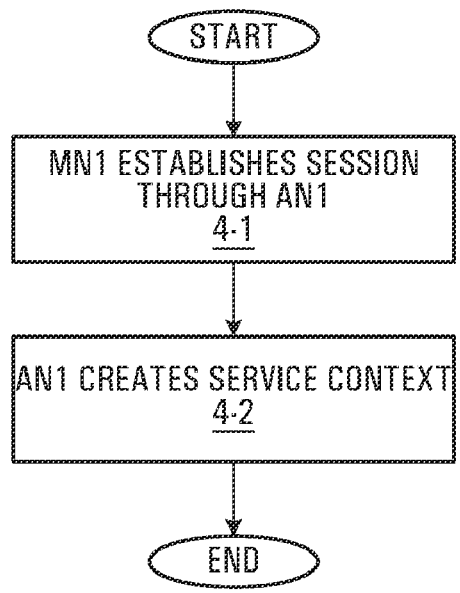

A second scenario will be described with reference to the sequence diagram of FIG. 4 which relates to context creation. In step 4-1, MN54 establishes a communications session through AN1, which establishes one or more microflows through AN1. In step 4-2, AN1 creates the service context to support MN54 and it's microflows. It is noted that this last step 4-2 is not required in all cases; if AN1 is set up as a context source when CG54 is created, then the MCDF will respond to candidates that AN1 is a context source. If MN54 does not have any flows established when a context transfer is requested, AN1 simply delivers null context. This only applies to the first AN in the CG.

Figure 5:
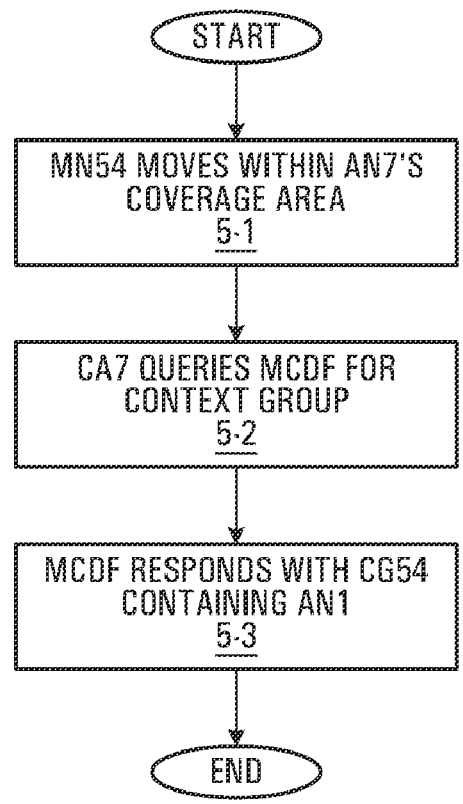

A third scenario will be described with reference to the sequence diagram of FIG. 5 which relates to adding an AN to a context group. The scenario begins when MN54 moves and is detected within AN7's coverage area and AN7 receives a MAE notification (step 5-1). In step 5-2, CTA7 (at AN7) queries the MCDF on the existence of a context group for MN54, using MDP. In step 5-3, the MCDF responds to CTA7, using MDP, that CG54 exists, and provides a list of the identities of the context source ANs for all of MN54's microflows; in these scenarios, the only context source so far being AN1.

Figure 6:
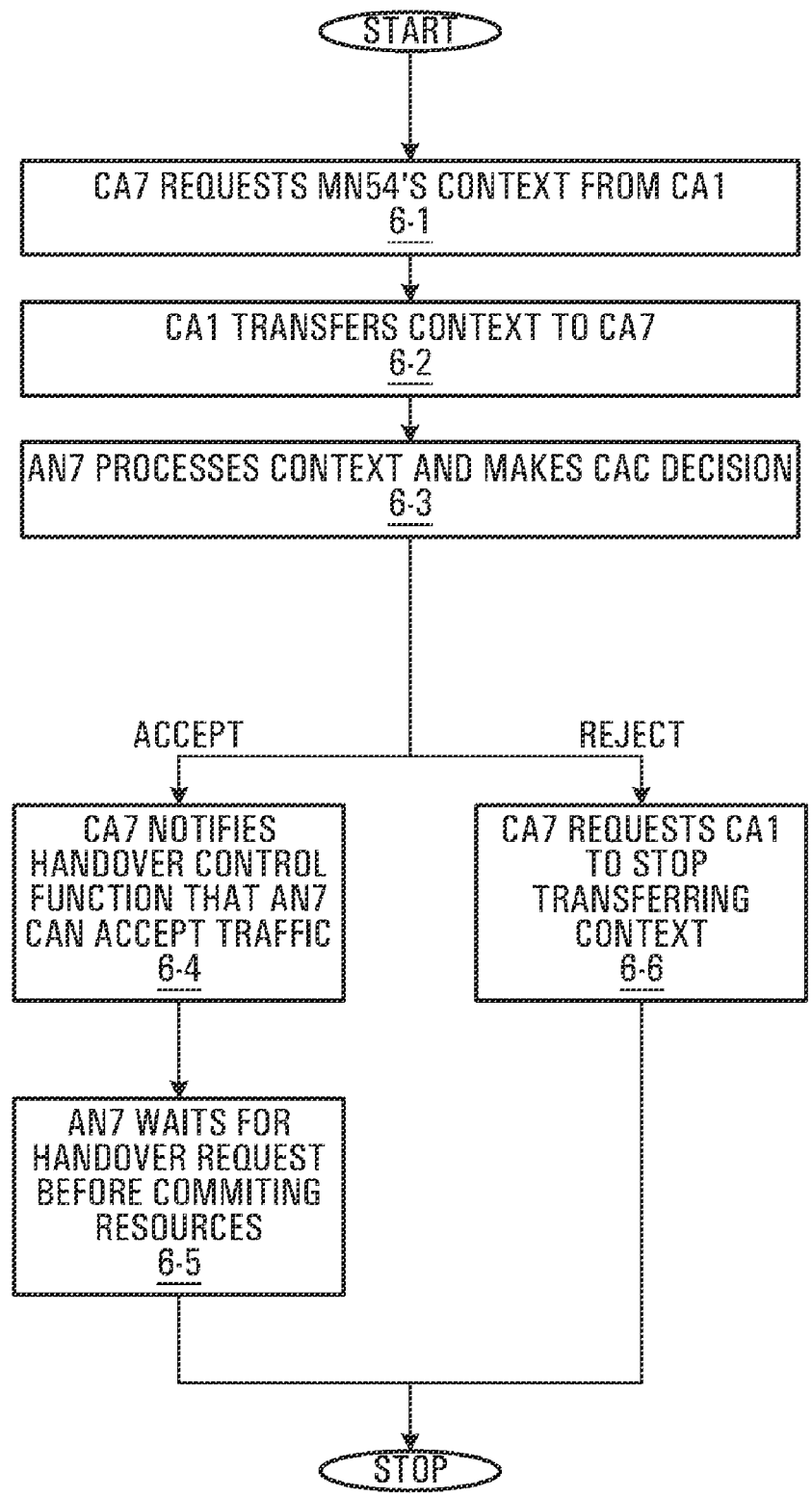

A fourth scenario will be described with reference to the sequence diagram of FIG. 6 which relates to Context Transfer in "demand mode". In step 6-1, CTA7 sends a context transfer request to CTA1 for MN54's context, using CTP. In step 6-2, CTA1 transfers the configuration context for MN54 to CTA7, using CTP. In step 6-3, AN7 processes the received context to determine if it has the capability and resources to support MN54's traffic (admission control). In step 6-4, if AN7 is able to support MN54's traffic, CTA7 notifies the network handover control function that AN7 is prepared to receive a handover of MN54's traffic, using CTP. In step 6-5, if AN7 is unable to support MN54's traffic, CTA7 requests CTA1 to stop transferring context for MN54, using CTP. In step 6-6, AN7 waits for a handover request from the network handover control function before committing any resources to supporting MN54's traffic.

Figure 7:
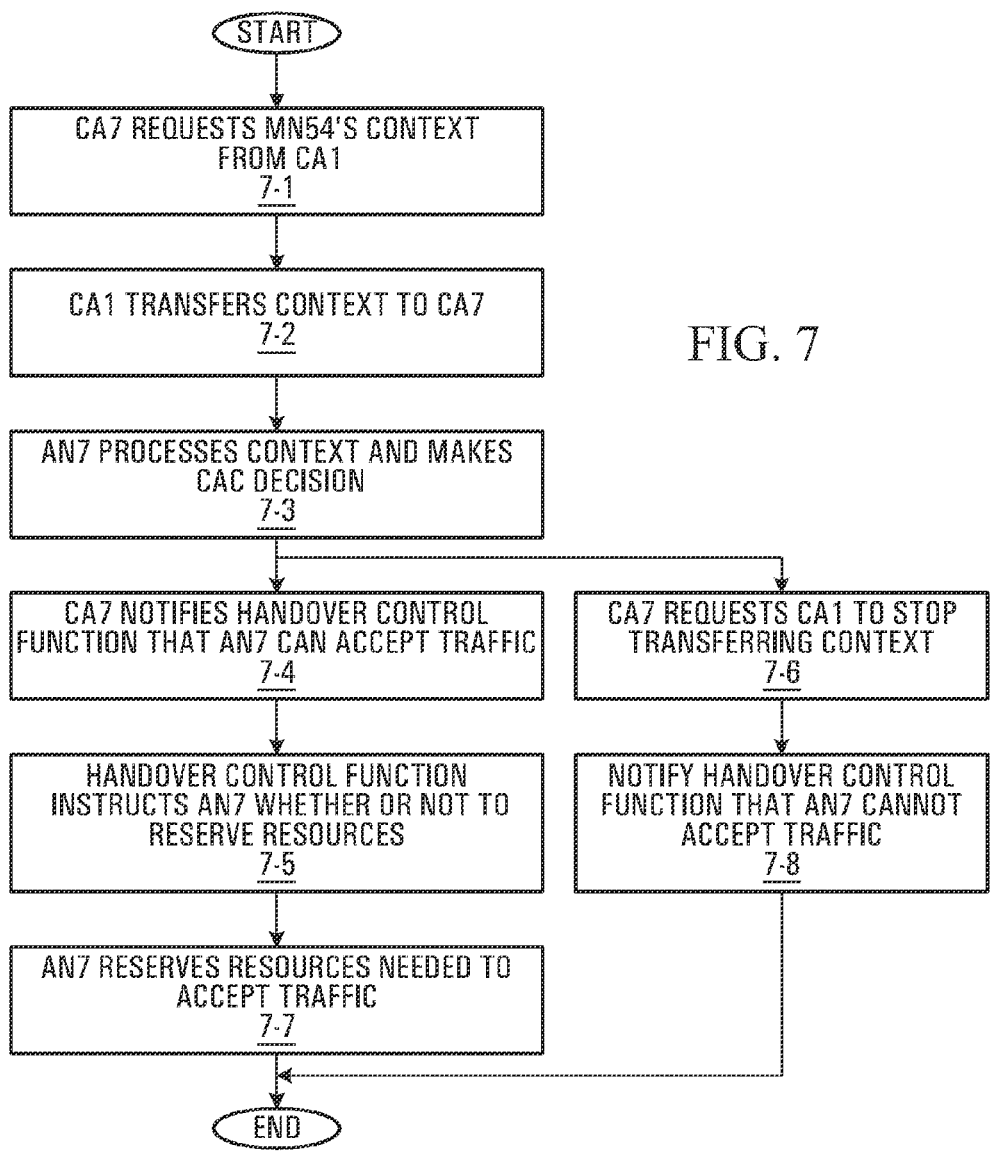

A fifth scenario will be described with reference to the sequence diagram of FIG. 7 which relates to Context Transfer in Reservation Mode. In step 7-1, CTA7 sends a context transfer request to CTA1 for MN54's context, using CTP. In step 7-2, CTA1 transfers the first type (configuration) context for MN54 to CTA7, using CTP. In step 7-3, AN7 processes the received context to determines if it has the capability and resources to support MN54's traffic (admission control). In step 7-4, if AN7 is able to support MN54's traffic, CTA7 notifies the network handover control function (step 7-4). In step 7-5, the handover control function instructs AN7 whether or not to reserve (reservation mode) or not (demand mode) the resources required to accept the MN's traffic. If requested to do so, AN7 reserves the resources needed to support MN54's traffic (step 7-5). If AN7 is not able to support MN54's traffic, CTA7 requests CTA1 to stop transferring context in step 7-6 and advises the handover control function at step 7-8 that AN7 can not accept the traffic.

In another embodiment, every candidate AN reserves resources without waiting for instructions from a handover control function. This would be more consumptive of network resources.

Figure 8:
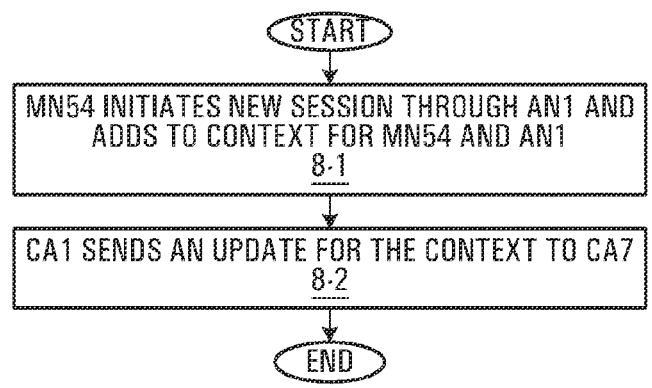

A sixth scenario will be described with reference to the sequence diagram of FIG. 8 which relates to an example context update as a result of an additional communications session. In step 8-1, MN54 initiates a new communications session, which introduces new microflow(s) through AN1, and adds to the context for MN54 at AN1. In step 8-2, CTA1 sends an update for the context to CTA7, using CTP, in accordance with the desired mode of the context transfer—demand or reservation mode.

Figure 9:
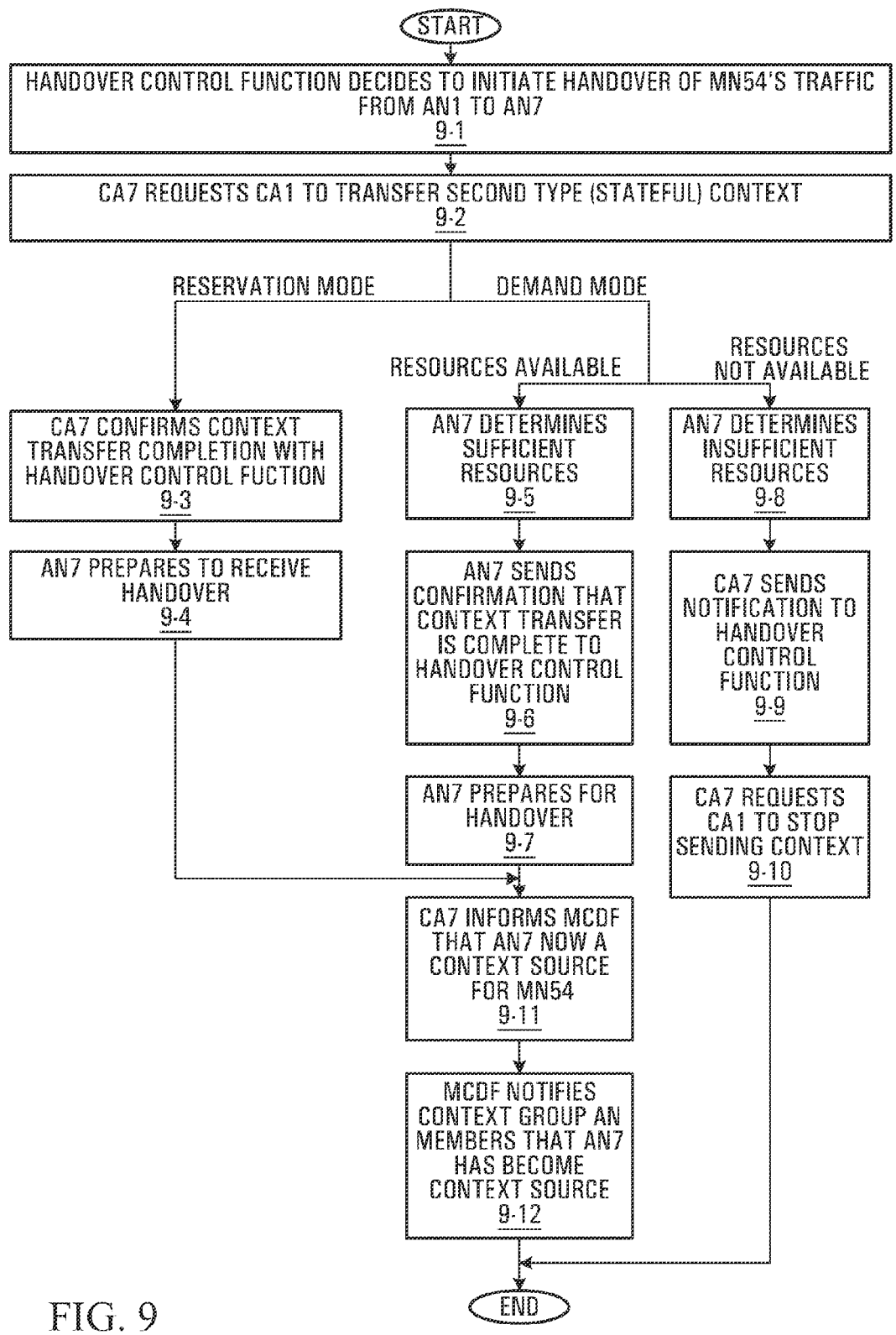

A seventh scenario will be described with reference to the sequence diagram of FIG. 9 which relates to context transfer preparation for packet forwarding. In step 9-1, the network handover control function decides to initiate a handover of MN54's traffic from AN1 to AN7 and notifies CTA7, using CTP. In step 9-2, CTA7 requests CTA1 to transfer the second type (stateful) context for MN54 to AN7, using CTP.

In reservation mode, in step 9-3 CTA7 sends a confirmation of the context transfer completion to the network handover control function, using CTP. In step 9-4 AN7 prepares to receive the handover of MN54's traffic.

In demand mode, in step 9-5, AN7 determines if the resources are available to support MN54's traffic (admission control). In step 9-6, if the resources are available, CTA7 sends a confirmation of the context transfer completion to the network handover control function, using CTP. In step 9-7, if the resources are available, AN7 prepares to receive the handover of MN54's traffic. In step 9-8, if the resources are not available, CTA7 notifies the network handover control function that it is unable to support a handover of MN54's traffic, using CTP. In step 9-9, if the resources are not available, CTA7 requests CTA1 to stop transferring context for MN54, using CTP. In step 9-10, if the stateful context transfer was successful, implying that the handover of MN54's traffic will also be successful, CTA7 informs the MCDF that AN7 is now the context source for MN54, using MDP. In step 9-11, if the stateful context transfer was successful the MCDF notifies the context group candidate AN members scenarios that AN7 has become the source for MN54's context, using MDP.

Further context transfer examples will now be given with reference to FIGS. 2B through 2E. These figures use the same example network of FIG. 2A. To begin, in FIG. 2B, it is assumed that MN54 has moved within the coverage area of AN1, and more specifically of AP5, and that a traffic flow has been set up through the network from AN1 using AN5 and AN8.

Figure 2C:
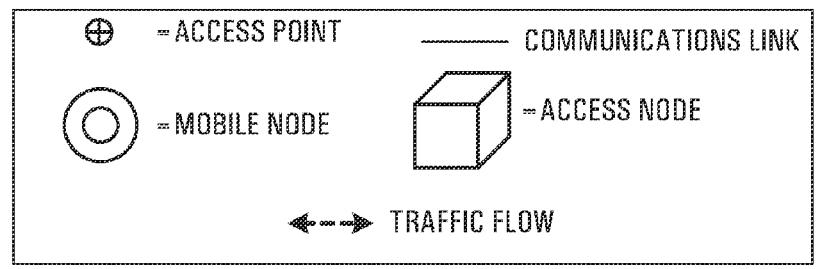
Figure 2C:
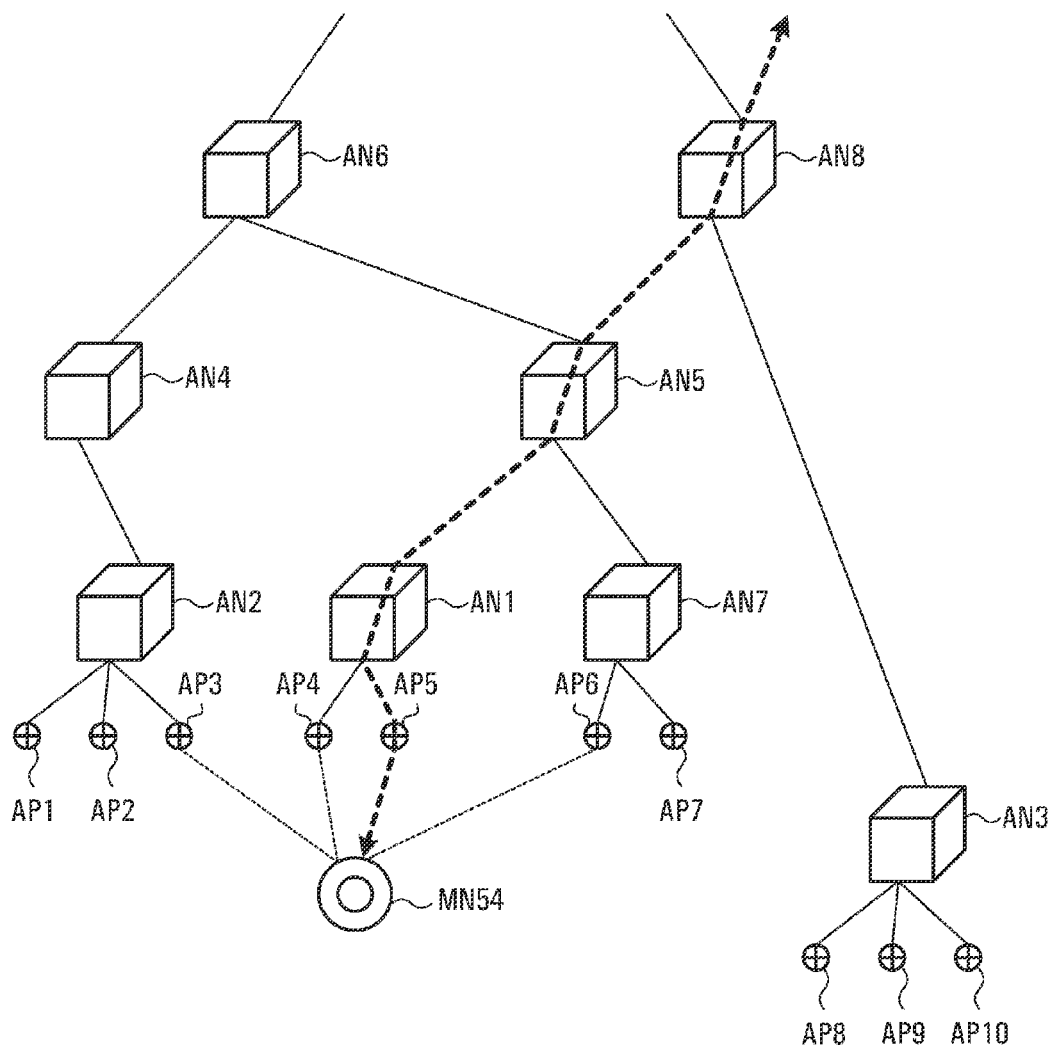

In FIG. 2C, it is assumed that now the mobile node MN54 can be detected by AN2 through AP3, by AN1 through AP4 and AP5, and by AN7 through AP6. Now the access nodes involved in the traffic flow, namely AN1, AN5 and AN8 are available as a source access nodes. The access nodes which would be involved in setting up the path from each of the other access nodes which can now see the mobile node also become candidate nodes. In this case this includes AN2, AN4 and AN6 in order to set up a path from AN2, and AN7 in order to set up a path from AN7 through AN5 and AN8.

Figure 2D:
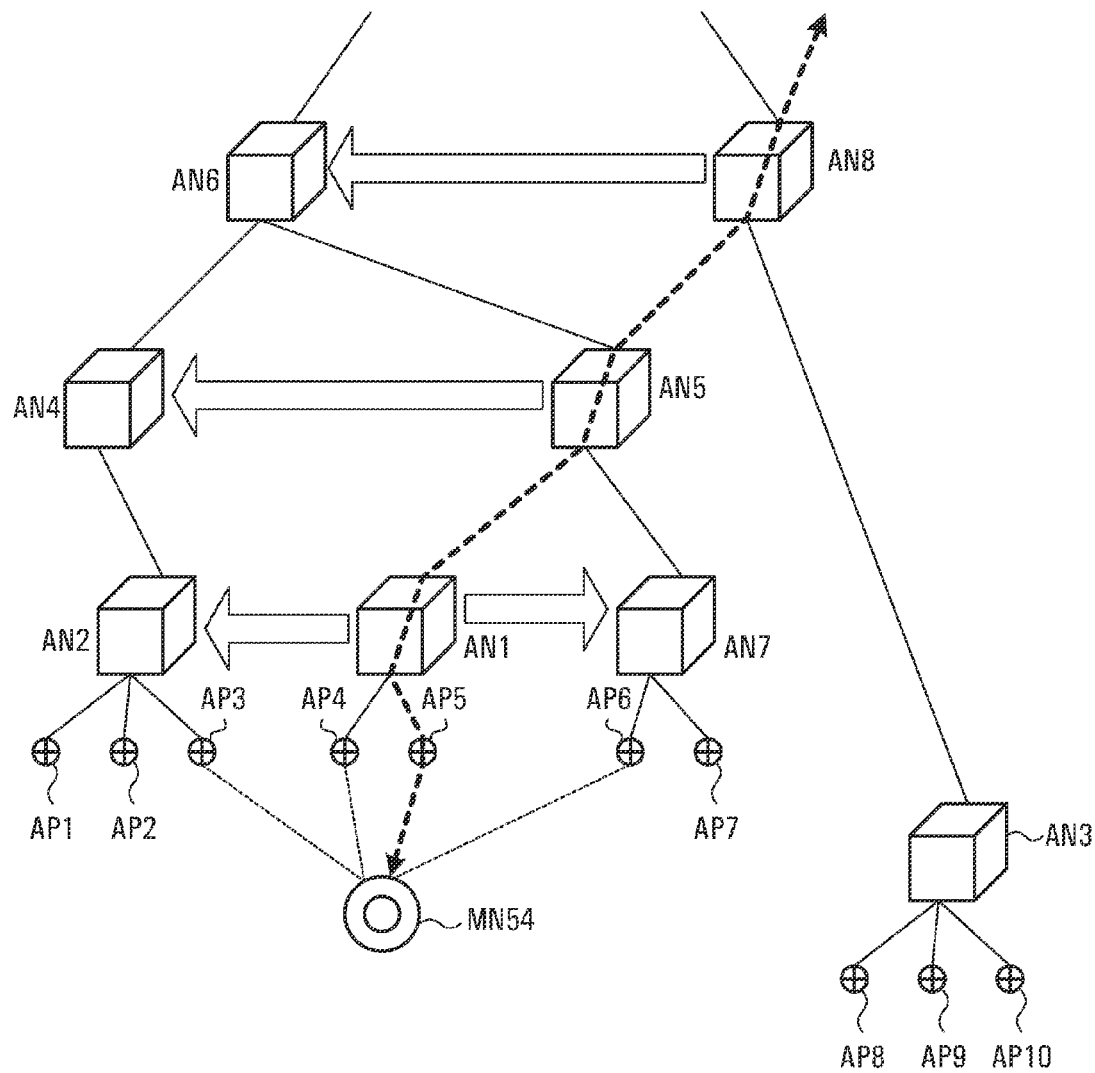

FIG. 2D illustrates symbolically the transfer of context. In this case it is assumed that candidate access node AN2 is retrieving its context from source AN AN1. Candidate AN AN4 retrieves its context from source AN AN5. Candidate AN AN6 retrieves its context from source AN AN8. Finally, candidate AN AN7 obtains its context from source AN AN1.

Figure 2E:
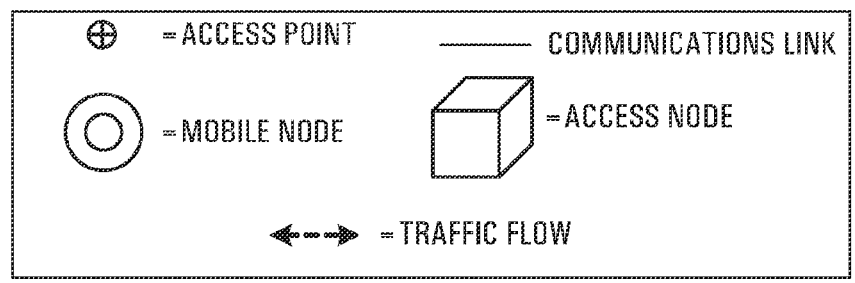
Figure 2E:
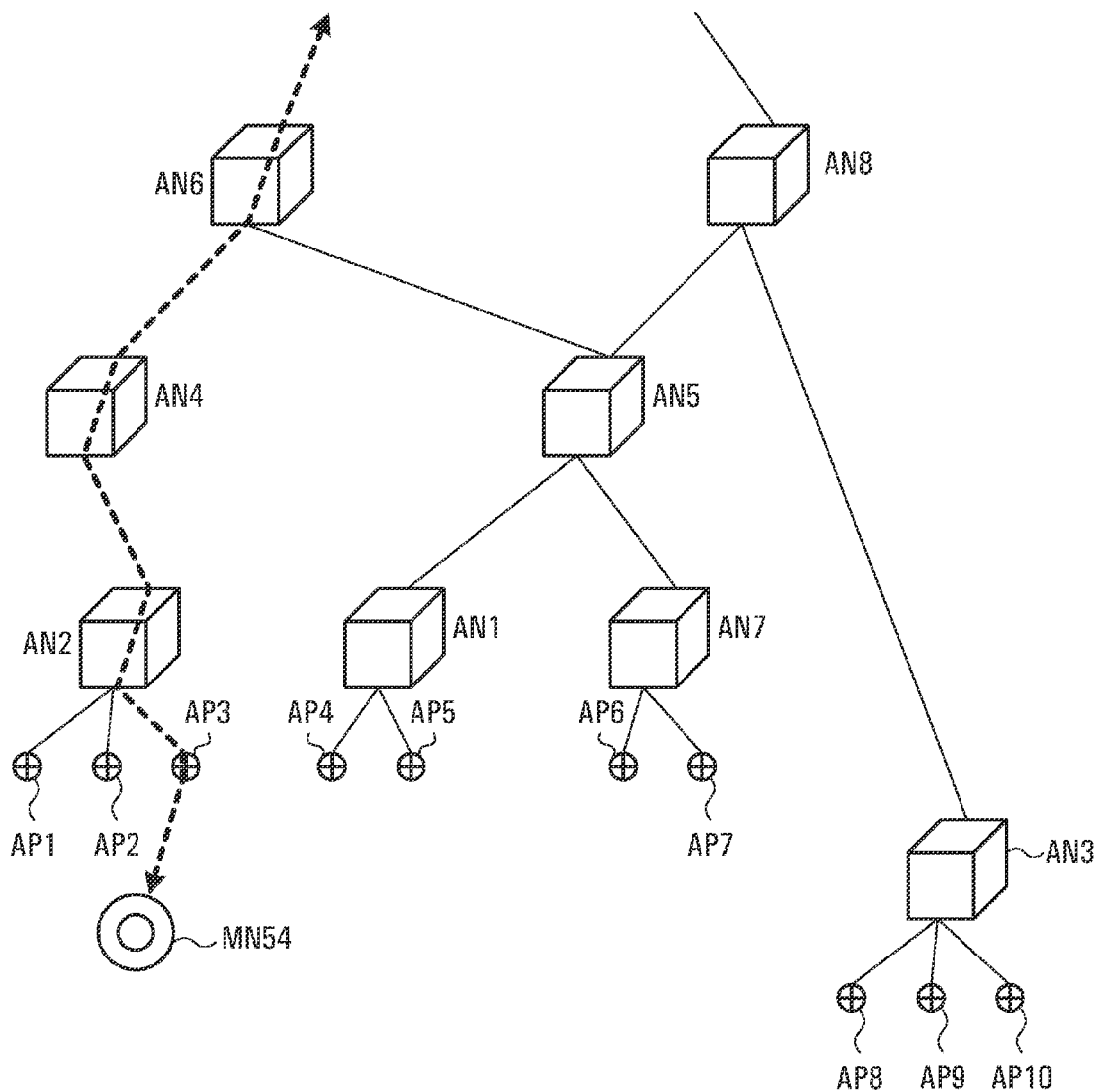
Figure 3:
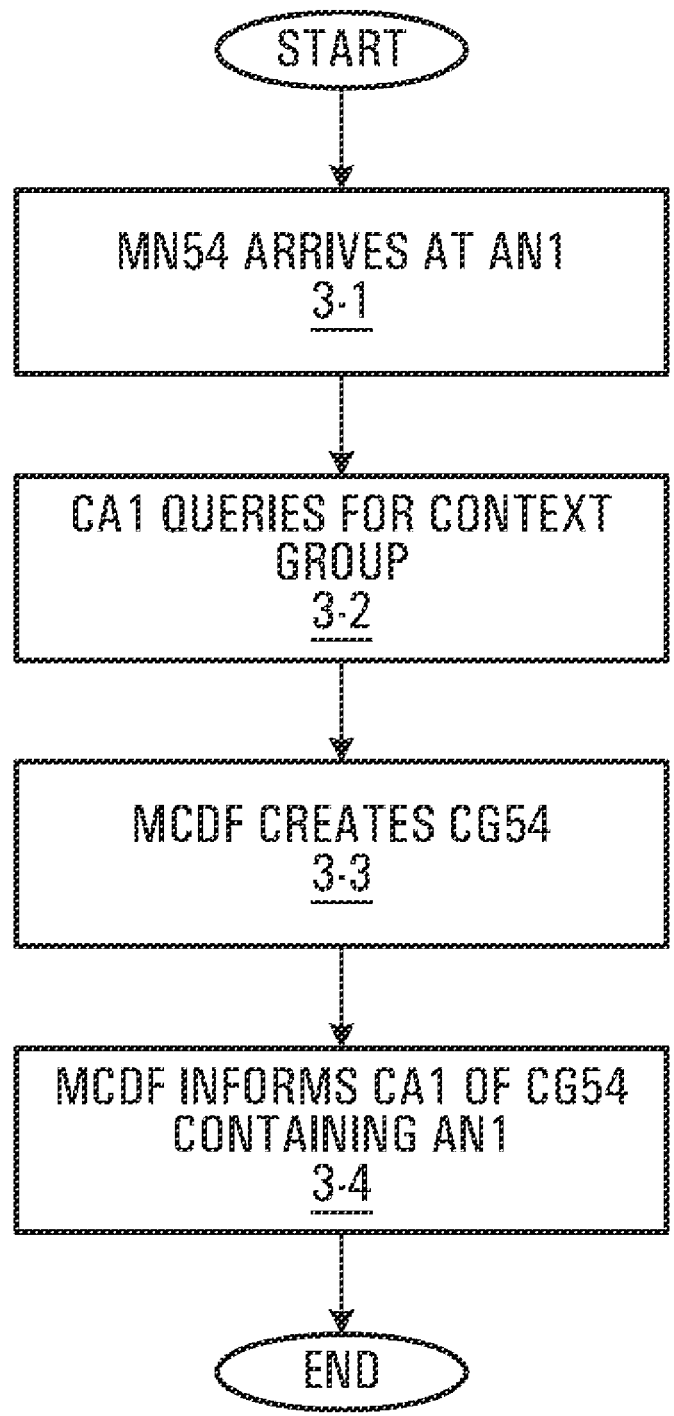
FIGS. 3 to 9 are sequence diagrams of example context transfer scenarios.

Finally, after a handoff has occurred to the path involving AN2, AN4 and AN6, the appearance of the network is that of FIG. 2E which shows the traffic flow now going through those nodes.

Figure 10:
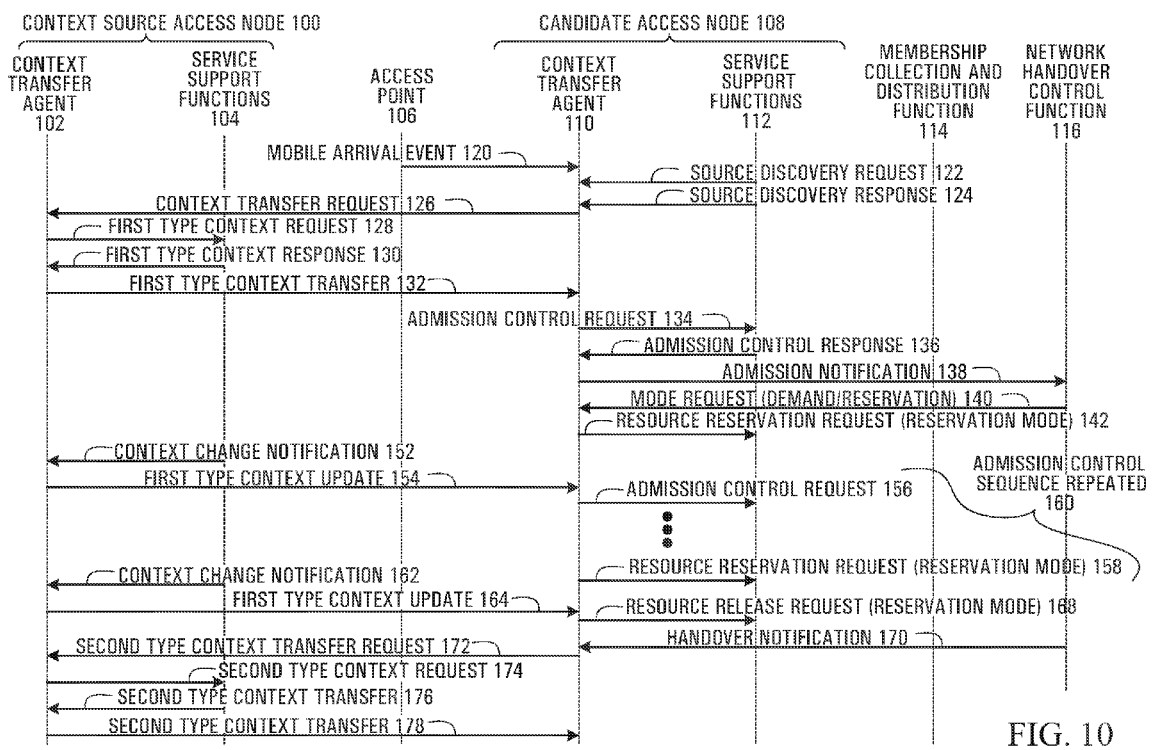
FIG. 10 is a detailed example context transfer sequence illustration.

FIG. 10 is a detailed example context transfer sequence illustration. This shows the protocol transfers between various elements including a context source access node 100, an access point 106, a candidate access node 108, a membership collection and distribution function 114 and a network handover control function 116. In this example the context source access node 100 has a context transfer agent 102 and one or more service support functions 104. Similarly, the candidate access node 108 has a context transfer agent 110 and one or more service support functions 112. The example begins with event 120 which consists of a mobile arrival event sent from the access point 106 to the context transfer agent 110 indicating that the access point can now detect the mobile node within its coverage area and therefore the mobile node is within the coverage area of the candidate access node 108.

Event 122 represents the context transfer agent 110 requesting from the MCDF 114 a source discovery request. The MCDF responds with event 124 which is a source discovery response. This will indicate to the candidate access node 108 that a context group for the mobile node has already been created and that the context source access node 100 is in the context group. The context transfer agent 110 then with event 126 sends a context transfer request to the context transfer agent 102 of the context source access node 100. The context transfer agent 102 then collects any necessary context with requests 128 and responses 130 to and from service support functions 104. The context transfer agent 102 then configures the context for transmission and sends it to the context transfer agent 110 of the candidate access node 108 with first type context transfer event 132.

The example continues with the candidate access node 108 context transfer agent 110 sending an admission control request 132 to a service support function 112 on the candidate access node 108 responsible for admission control. The service support function 112 responds with event 136 indicating whether or not the candidate access node 108 is capable of setting up a service specified by the context received from the context source access node 100. The decision is then forwarded to the network handover control function 116 with event 138. The network handover control function 116 then with event 140 instructs the candidate access node 108 with a mode request which is either a demand or reservation as described previously. Assuming that it is a reservation request, the context transfer agent 110 then proceeds with a resource reservation request 141 to the relevant service function feature 112 on the candidate access node to reserve the required resources with event 142. In the event some change in the context occurs, for example the addition of a microflow, a service function feature 104 will notify the context transfer agent 102 in an event 152. Assuming this is part of the first type context, a first type context update event 154 occurs by which this change is forwarded to the context transfer agent 110 of the candidate access node 108. With each change, the candidate access node repeats the admission control sequence 160 as summarized by event 156 and 158.

In the event the change in context involves the release of an existing microflow (messages 162, 164) then in reservation mode the context transfer agent 110 will send a resource release request 168 to the relevant service support function 112 to release the reserved resources.

When it is time for a handover to occur, a handover notification from the network handover control function 116 may be sent with event 170 to the candidate access node 108 context transfer agent 110. At that time the context transfer agent 110 sends a request for the second type context with event 172 to the context transfer agent 102. The context transfer agent 102 collects the second type context from the relevant service support function 104 with event 174 and response 176. It then transmits the second type context to the candidate access node 108 with event 178.

The above described embodiment provides a system and method in which a set of candidate access nodes are kept up to date with context information for a mobile node's microflows. In a preferred embodiment, this is done by first sending first type context information to all of the candidate access nodes, and then by sending type two context information only to access nodes which actually take over support for the microflows.

The syntax and semantics of the context information transferred between ANs are specific to each service feature represented, and the interpretation of a given service feature context has relevance only to the functional entity or entities that directly support the service feature. In a preferred embodiment of this context transfer framework, the context is transferred using data encapsulation, so that the format and interpretation of the context information is hidden from all but the specific feature functional entities at each AN. The context transfer framework provides the capabilities that support the timely transfer of context between ANs and, hence, seamless mobility for all types of context, with no need for the context transfer entities to know the syntax and semantics of the context. At the context source AN, a service support functional entity encapsulates its context into a data object. This object has a label which identifies the service feature the context is associated with, and any additional information needed to ensure reliable transfer of the context. An example of the latter would be fields to indicate the size of the encapsulated data, the time of creation of the data object, identify sequence order for the service feature context information, and provide protection against errors incurred during transfer. The context information itself is hidden within the data object, and appears as a collection of bits that are meaningless to the context transfer entities.

Figure 11:
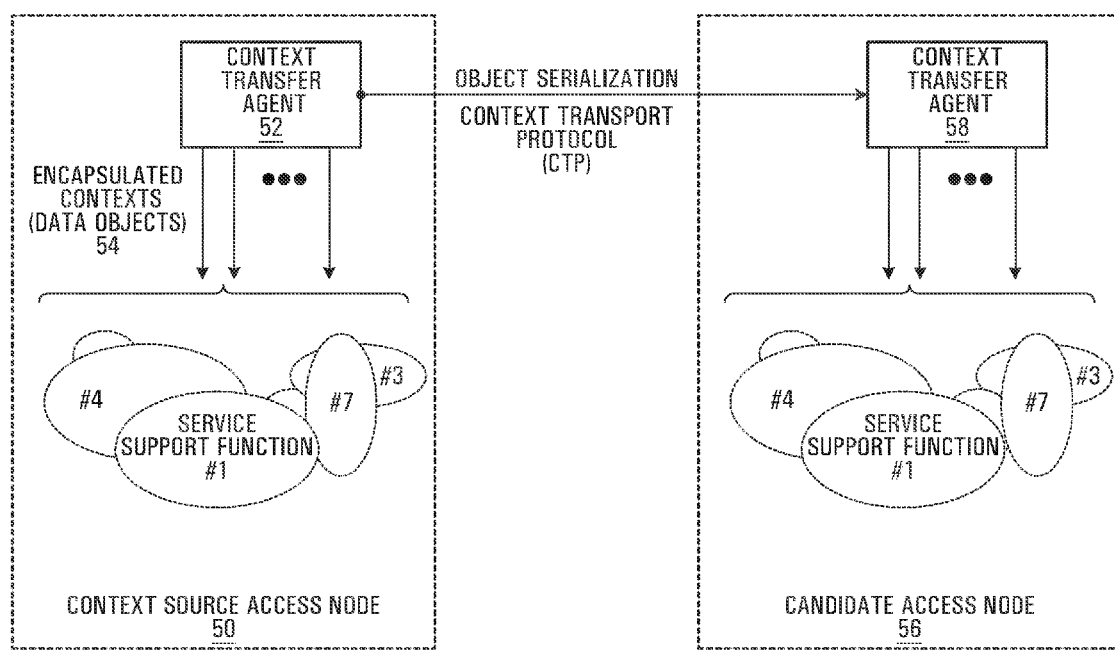
FIG. 11 is a summary diagram of context information encapsulation and transfer.

As a result of the encapsulation this context transfer solution is applicable to any service feature requiring context transfer. The context information encapsulation also contributes to ensuring the integrity of the delivered context, for if the syntax and semantics of the information is not available to the context transfer entities, there can be no attempt to manipulate the information. The context transfer solution simply transports a collection of service feature data objects from one AN to another. FIG. 11 shows a simple example of this context transfer. FIG. 11 shows a context source access node 50 with its context transfer agent 52 in communication using CTP with a candidate access node 56 having its respective context transfer agent 58. In this case, the context source access node has encapsulated a number of feature context data objects 54. These data objects are transported using CTP to the context transfer agent 58 on the candidate access node where the encapsulated feature contexts are extracted from the data objects and set up on the candidate access node.

One method for the transfer of service feature context objects involves object serialization. However, there are a number of methods for data object transfer that could be used in implementing the progressive context transfer approach.

Object serialization in a system is the process of creating a representation of an object as successive parts. Object values and types are serialized with sufficient information to insure that the equivalent typed object can be recreated. De-serialization is the symmetric process of recreating the object from the serialized representation. The object serialization and de-serialization mechanism allows objects to be encoded into a byte or bit stream suitable for transport through communications network, and re-created the at the destination.

In some embodiments, the invention is adapted for use when the mobile node is a wireless mobile node. More generally the invention may be applied in the context of any node with some type of mobility capability. Wireline mobility for example involves disconnecting a wireline connection from one point and reconnecting to another.

Numerous modifications and variations of the present invention are possible in light of the above teachings. It is therefore to be understood that within the scope of the appended claims, the invention may be practised otherwise than as specifically described herein.

We claim:

1. A system for providing mobility support for traffic of a mobile node, the system comprising:
a first access node operable to serve a mobile node; and
a first context agent associated with the first access node, the first context agent being operable to:
transfer first context information of the mobile node to at least one second context agent associated with at least one second access node, the at least one second access node being a candidate for carrying traffic of the mobile node, and the transfer being made before the at least one second access node is a target for handoff; and
transfer second context information of the mobile node to the at least one second context agent at or near handoff, the second context information comprising stateful context.

2. The system of claim 1, further comprising a membership collection and distribution function operable to collect context information for the mobile node.

3. The system of claim 2, wherein the membership collection and distribution function is at least partially implemented at the first access node.

4. The system of claim 2, wherein the membership collection and distribution function is implemented remote from the first access node.

5. The system of claim 1, wherein the second context information comprises context information that is likely to change relatively frequently.

6. The system of claim 1, wherein the first context information comprises context information that is likely to change relatively infrequently.

7. The system of claim 1, wherein the first context information comprises configuration context.

8. The system of claim 7, wherein the configuration context comprises at least one of traffic classification rules, classes of service, authentication and authorization.

9. The system of claim 1, wherein the second context information comprises variable context.

10. The system of claim 9, wherein the variable context comprises at least one of state variables for a header compression algorithm, metering variables, accounting variables, buffer state information variables, accounting state variables and multicast group membership state variables.

11. The system of claim 1, wherein the first context agent is operable to:
  receive a first request for context information from the at least one second context agent; and
  transfer the first context information in response to the received first request.

12. The system of claim 11, wherein the first context agent is operable to:
  receive a second request for context information from the at least one second context agent; and
  transfer the second context information in response to the received second request.

13. The system of claim 1, wherein the first context agent is operable to:
  send a first request for context information to another context agent serving another mobile node when the first access node is a candidate for carrying traffic of the other mobile node but is not yet a target for handoff of the other mobile node;
  receive context information sent by the other context agent in response to the first request.

14. The system of claim 13, wherein the first context agent is operable to:
  send a second request for context information to the other context agent when the first access node is a target for handoff of the other mobile node.

15. The system of claim 1, wherein the first context agent is operable to transfer the first context information by sending a context transfer message comprising at least one of:
  information concerning at least one service feature with which the first context information is associated;
  information concerning a size of the first context information; and
  information for protection against errors.

16. The system of claim 1, wherein the first context agent is operable to transfer the second context information by sending a context transfer message comprising at least one of:
  information concerning at least one service feature with which the first context information is associated;
  information concerning a size of the first context information; and
  information for protection against errors.

17. The system of claim 1, wherein the first context agent is operable to transfer context information of a mobile node served by the first access node to a context agent associated with another access node in response to the mobile node being handed off to the other access node if the context information of the mobile node has not been handed off to the context agent associated with the other access node before the mobile node is handed off.

18. The system of claim 1, further comprising the at least one second access node and the at least one second context agent.

19. The system of claim 18, wherein:
  the at least one second context agent is operable to send a first request for context information to the first context agent when the second access node is a candidate for carrying traffic of the mobile node but is not yet a target for handoff of the mobile node:
  the first context agent is operable to receive the first request for context information from the at least one second context agent; and
  the first context agent is operable to transfer the first context information in response to the received first request.

20. The system of claim 19, wherein:
  the at least one second context agent is operable to send a second request for context information to the first context agent when the second access node is a target for handoff of the mobile node;
  the first context agent is operable to receive the second request for context information from the at least one second context agent; and
  the first context agent is operable to transfer the second context information in response to the received second request.

21. The system of claim 18, further comprising a membership collection and distribution function operable to collect context information for the mobile node.

22. The system of claim 21, wherein the membership collection and distribution function is at least partially implemented at the first access node and at least partially implemented at the at least one second access node.

* * * * *